Feb. 7, 1928.

G. W. PERKS 1,658,173

METHOD OF BUILDING UP BEARINGS OR THE LIKE
AND COMPOSITION FOR USE THEREIN

Original Filed Jan. 26, 1927

INVENTOR.
GEORGE W. PERKS.
BY Ely + Barrow
ATTORNEYS.

Patented Feb. 7, 1928.

1,658,173

UNITED STATES PATENT OFFICE.

GEORGE W. PERKS, OF AKRON, OHIO.

METHOD OF BUILDING UP BEARINGS OR THE LIKE AND COMPOSITION FOR USE THEREIN.

Application filed January 26, 1927, Serial No. 163,812. Renewed May 27, 1927.

The present invention relates to a new and useful method of building up worn bearings or similar device to fill up depressions or worn spots therein and to restore the bearing to its approximate original contour without necessitating the removal of the bearing or replacement of the original parts thereof. While the invention is described as particularly adapted for the restoration of worn and loose bearings for rotating shafts, it is of wide application and may be applied to metal fittings or connections of all kinds where the metal parts become worn or loose and require refitting.

The invention also has for its object the provision of an improved composition or mixture for use in building up bearings or the like.

The advantages of the invention are that the bearings or fittings are repaired in situ and with little labor or expense. In addition a superior fitting is obtained. In fact, in many instances a better bearing is obtained than the original bearing or fitting. By practising the method of the present invention it is possible also to obtain a self-lubricating bearing or fitting, and one which will outlast the original bearing or fitting.

For the purpose of illustration, the drawings show the method of applying the renewed or refinished bearing to a babbitted shaft bearing, it being understood that the invention is broader in scope and its possibilities in all sorts of metal work or machinery are unlimited.

Figure 1:
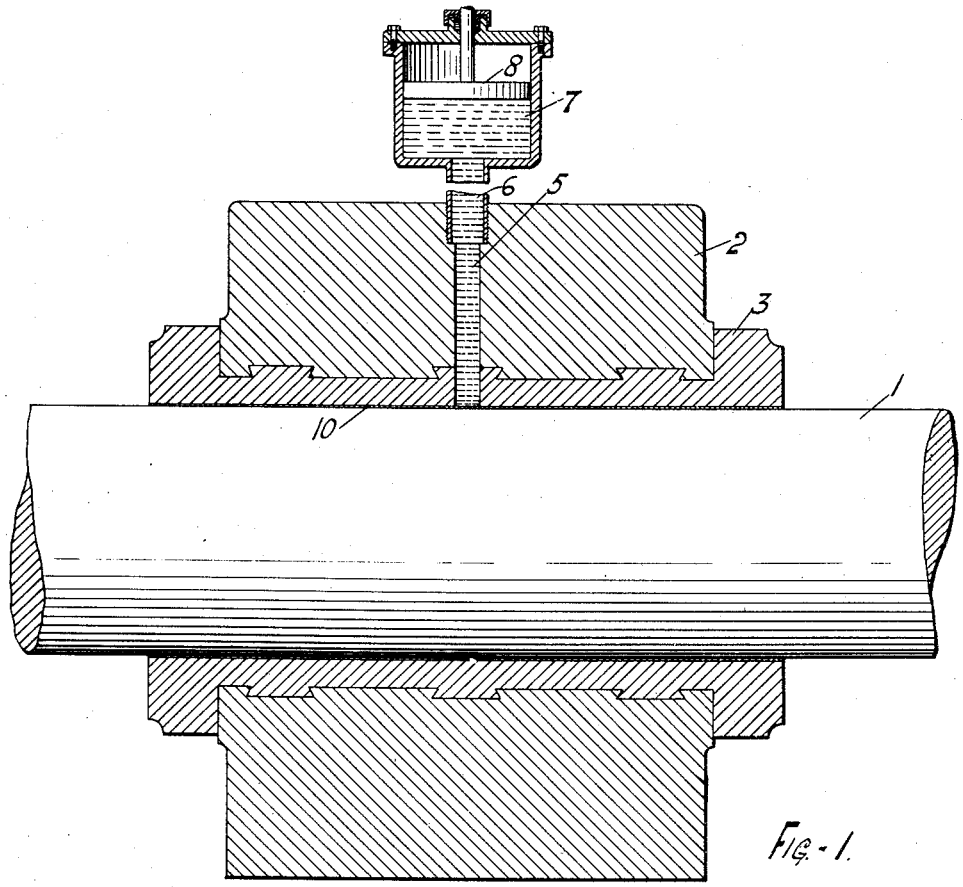
Figure 1 is a sectional view through a shaft bearing showing the method of building up the worn babbitt about the rotation shaft.
Figure 2:
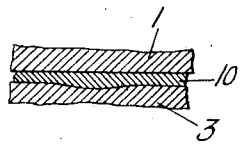
Figure 2 is an enlarged fragmentary section through a refinished bearing.

In the drawing 1 represents a rotating shaft and 2 the housing. A babbitt lining for the shaft bearing is indicated at 3.

When the shaft bearing becomes loose or worn a hole 5 is bored at any convenient place through the housing for the bearing, or, if desired, the lubrication hole may be used for the purposes of the invention. To the hole 5 is attached a conduit 6 which leads from a reservoir or storage supply of the mixture 7 used for rebuilding the bearing. The mixture is forced through the opening into the loose bearing by a force pump or piston 8 which is designed to apply adequate pressure to the mixture and cause it to flow into the bearing, where it collects in the depressions or loose spots in the bearing sleeve.

The mixture embodying the invention and which is used for this purpose comprises a sufficient quantity of soft metal, either copper, lead, zinc, or other suitable metal, which is of a particular and peculiar spongy structure. Heretofore finely divided or powdered metal has been obtainable only in the form of a powder in which the individual particles have been granular or in the form of minute, solid, round or ovoid bodies without any ready ability to knit together or form in a coherent or compact mass with slight pressure. It is possible to obtain a spongy form of powdered or finely divided metal, by the use of which the invention herein described is possible.

Figure 3:
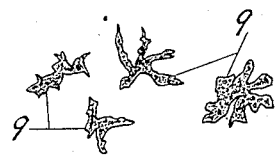
Figure 3 is an enlarged view of the metallic particles which form the body or base of the renewed bearing material.

Minute particles of metal 9 are obtainable which constitute a material having physical characteristics and peculiar and distinctive properties different from other forms of powdered or finely divided metal. Copper, lead, zinc and many other metals are obtainable, in which the finely divided particles are soft and sponge-like and provided with numerous small tentacles or projections by which the individual particles will knit together. Particles of metal in the form described, with even a slight degree of pressure when pressed together, will adhere and form flakes, sheets, or blocks which are substantially homogeneous, and it is due to this property of the metal that the bearings may be built up by the use of the present process. Microscopic views of particles 9 of metal are attempted to be illustrated in Figure 3 of the drawings.

In forming the mixture the desired proportions of metals are mixed together with a fluid vehicle or carrier, preferably oil or a similar substance. The metals which may be used vary considerably in accordance with the particular uses to which the process is to be applied, copper, zinc, lead or other metals being employed or any suitable admixture of two or more of the same. Certain proportions of copper and lead have been used with considerable success. With the mixture may be employed a suitable solid lubricant such as graphite.

When the mixture of metal, carrier and lubricant to be used is applied to the bearing with such compression as may be required, the mixture will flow into the crevices or low spots of the bearing and deposit the solid particles carried by it, the carrier seeping out through the bearing. The homogeneous disintegrated metal in the form of the minute particles which has been described having been deposited within the low spots will build up the bearing approximately to its original contour and virtually establish a new bearing in its place. The new film or bearing surface is indicated by the numeral 10 in the drawings.

In case of a bearing, or similar device the movement of the parts of the bearing will compact the metal particles together so that a smooth even bearing will be obtained. If graphite or other lubricant is to be employed in the mix, the particles thereof will remain and be embedded within the bearing. In the case of spring shackle bushings or other parts of automobiles the looseness between the parts will be taken up and close fitting bearing surfaces will be readily obtainable.

What is claimed is:

1. A composition for use in building up bearings or the like, said composition including one or more flocculent metals, the particles of which have numerous tentacles extending in many directions, a solid lubricant in comminuted condition, and a vehicle for suspending the metals and the lubricant so that the composition will be flowable under pressure into a bearing wherein the particles of metal and solid lubricant will knit together by interlocking of the tentacles.

2. A composition for use in building up bearings or the like, said composition including one or more flocculent metals, the particles of which have numerous tentacles, and a vehicle for suspending the metals so that the composition will be flowable under pressure into a bearing wherein the particles of metal will knit together by interlocking of the tentacles.

3. A composition for use in building up bearings or the like, said composition including one or more flocculent metals, the particles of which have numerous tentacles extending in many directions, and a vehicle for suspending the metals so that the composition will be flowable into a bearing wherein the particles of metal will knit together by interlocking of the tentacles.

4. A composition comprising one or more flocculent metals having numerous tentacles thereon, and a vehicle for suspending the metals so as to be flowable.

GEORGE W. PERKS.